US011977050B2

(12) United States Patent
Fukaya et al.

(10) Patent No.: US 11,977,050 B2
(45) Date of Patent: May 7, 2024

(54) AUTOMATED ANALYZER, AUTOMATIC ANALYSIS SYSTEM, AND AUTOMATIC SAMPLE ANALYSIS METHOD

(71) Applicant: HITACHI HIGH-TECH CORPORATION, Tokyo (JP)

(72) Inventors: Masashi Fukaya, Tokyo (JP); Akihiro Yasui, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 544 days.

(21) Appl. No.: 17/284,121

(22) PCT Filed: Oct. 30, 2019

(86) PCT No.: PCT/JP2019/042495
§ 371 (c)(1),
(2) Date: Apr. 9, 2021

(87) PCT Pub. No.: WO2020/137140
PCT Pub. Date: Jul. 2, 2020

(65) Prior Publication Data
US 2021/0382000 A1 Dec. 9, 2021

(30) Foreign Application Priority Data
Dec. 27, 2018 (JP) .................. 2018-246128

(51) Int. Cl.
*G01N 27/416* (2006.01)
*G01N 27/333* (2006.01)
*G01N 35/10* (2006.01)

(52) U.S. Cl.
CPC ....... *G01N 27/416* (2013.01); *G01N 35/1009* (2013.01); *G01N 27/333* (2013.01)

(58) Field of Classification Search
CPC ............... G01N 27/416; G01N 27/333; G01N 35/1009; G05B 15/00; G05B 19/0421; G01B 99/00
See application file for complete search history.

(56) References Cited

U.S. PATENT DOCUMENTS

| 2014/0202828 A1* | 7/2014 | Ishigami | ............ G01N 35/1009 |
| | | | 198/340 |
| 2016/0054257 A1* | 2/2016 | Ishige | .................. G01N 27/021 |
| | | | 205/789 |
| 2018/0238829 A1* | 8/2018 | Watanabe | .......... G01N 27/4166 |

FOREIGN PATENT DOCUMENTS

| JP | 4-84770 A | 3/1992 |
| JP | 2003-139778 A | 5/2003 |

(Continued)

OTHER PUBLICATIONS

International Search Report, dated Jan. 21, 2020, for International Application No. PCT/JP2019/042495.

*Primary Examiner* — Alexander S Noguerola
(74) *Attorney, Agent, or Firm* — Baker Botts L.L.P.

(57) ABSTRACT

An analysis unit 111 for automatically analyzing a sample comprises a sample dispensing nozzle 2 for dispensing the sample and an electrolyte measurement unit 114 for carrying out internal standard liquid measurement one or more times at least before measuring the electric potential of the sample. If the electrolyte measurement unit 114 is to carry out the electric potential measurement of the sample in succession, a different internal standard liquid measurement operation is carried out before the electric potential measurement than if the electric potential measurement is not to be carried out in succession and there are to be gaps between measurement intervals. This results in the provision of an automated analyzer, automatic analysis system, and automatic sample analysis method that make it possible to reduce the influence (Continued)

of ambient temperature on electrolyte measurement, ensure measurement accuracy, and enhance overall device processing capacity.

16 Claims, 11 Drawing Sheets

(56) References Cited

FOREIGN PATENT DOCUMENTS

JP 2007-057367 A 3/2007
WO WO 2017029893 A1 * 2/2017 ......... G01N 27/4160

* cited by examiner

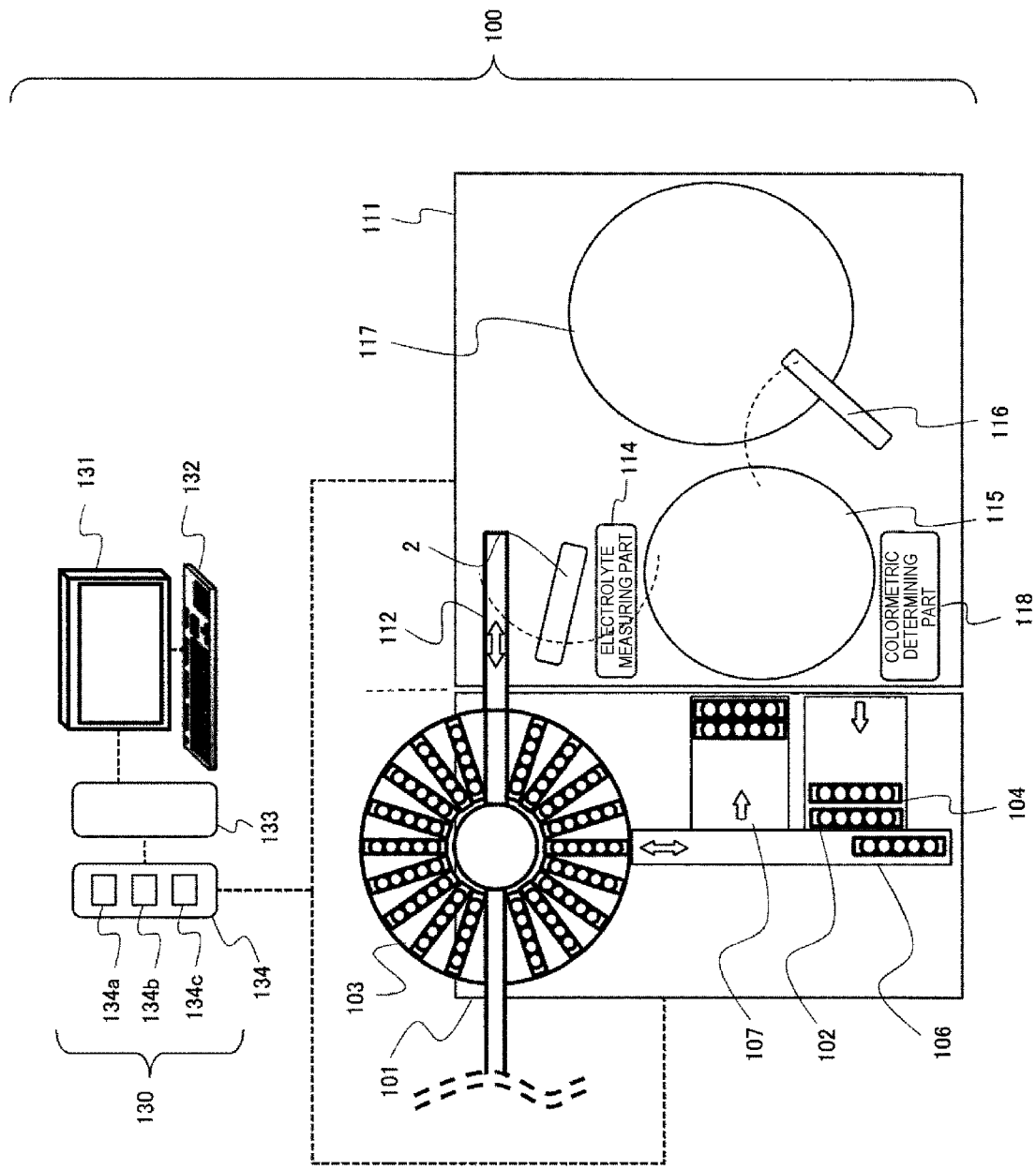
[FIG. 1]

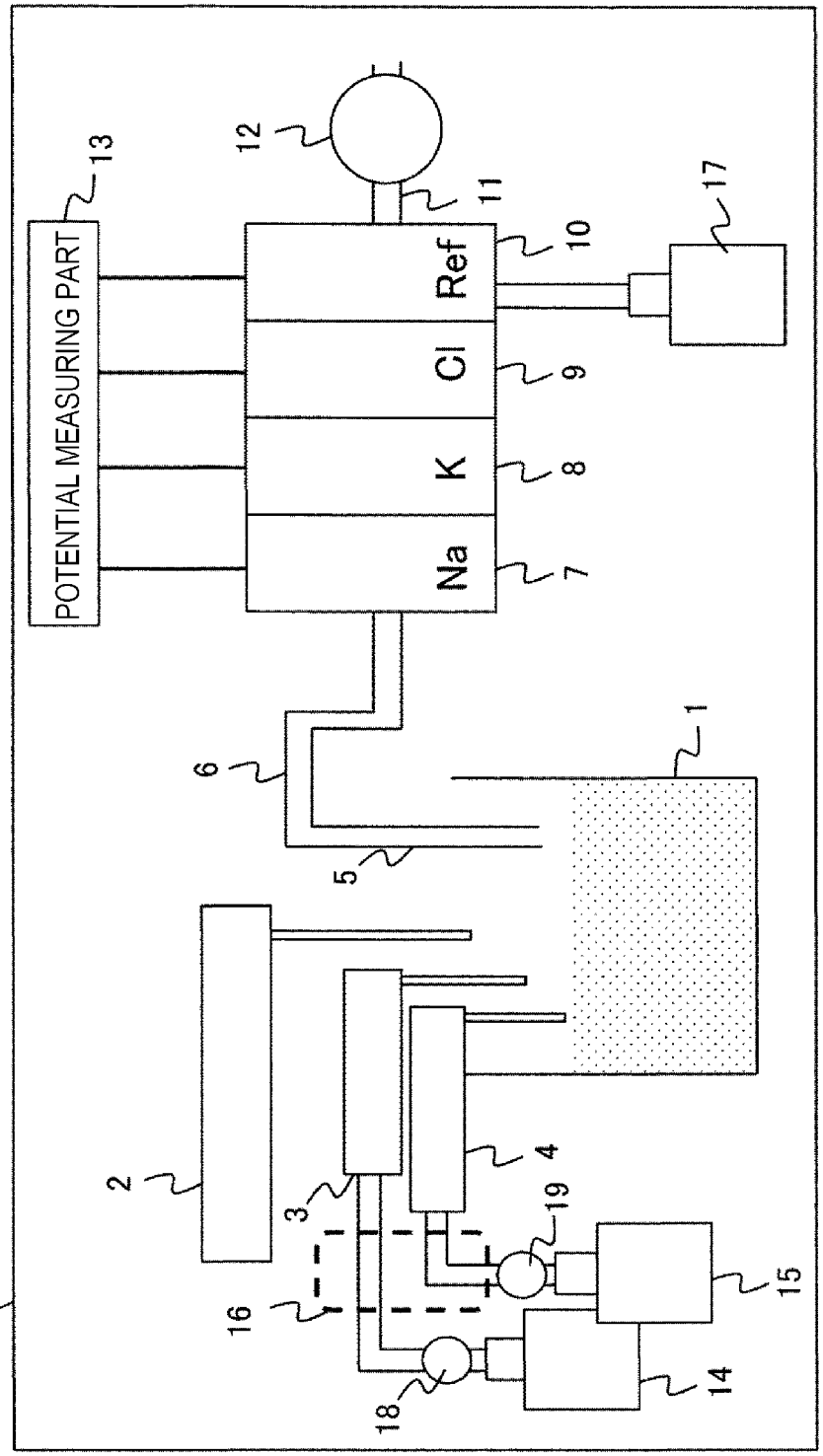
[FIG. 2]

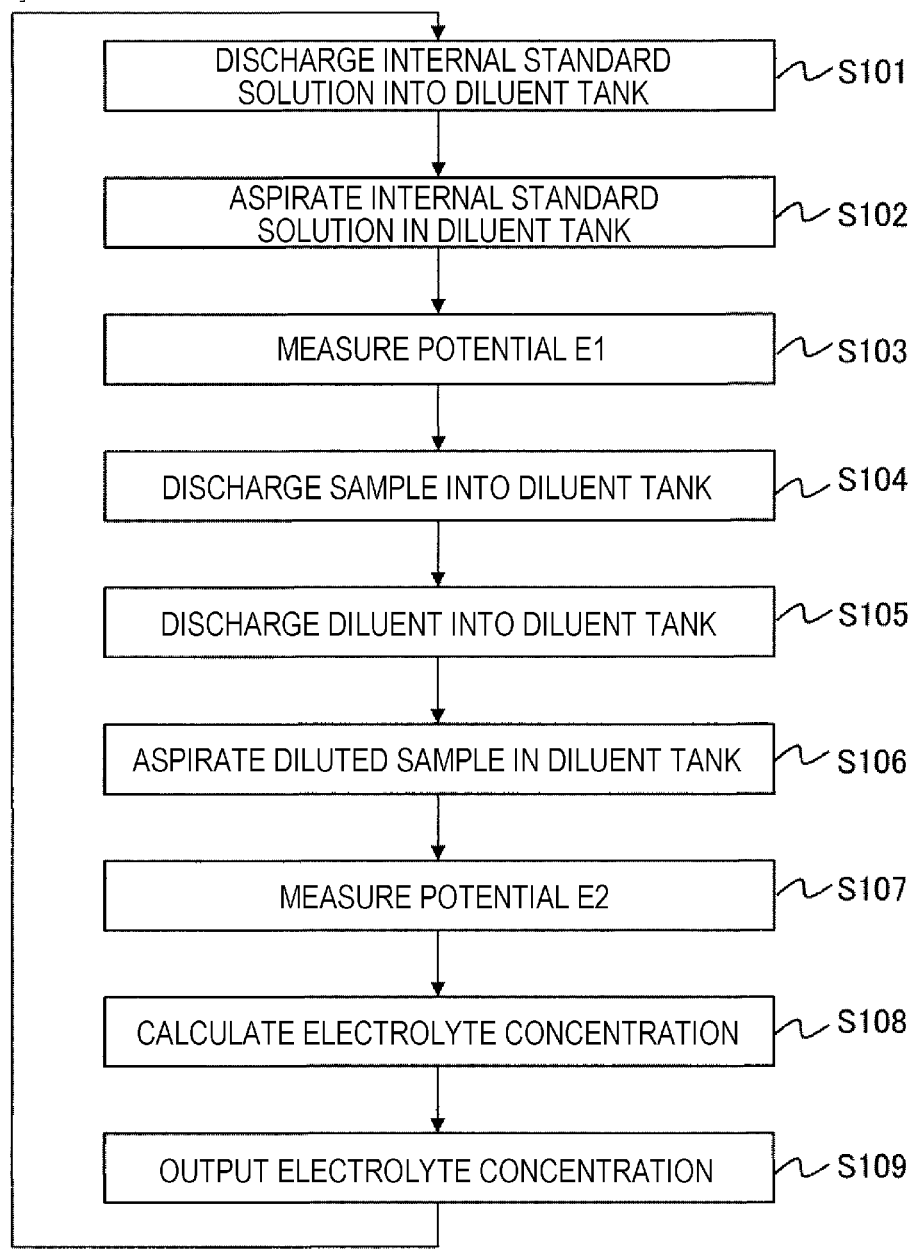

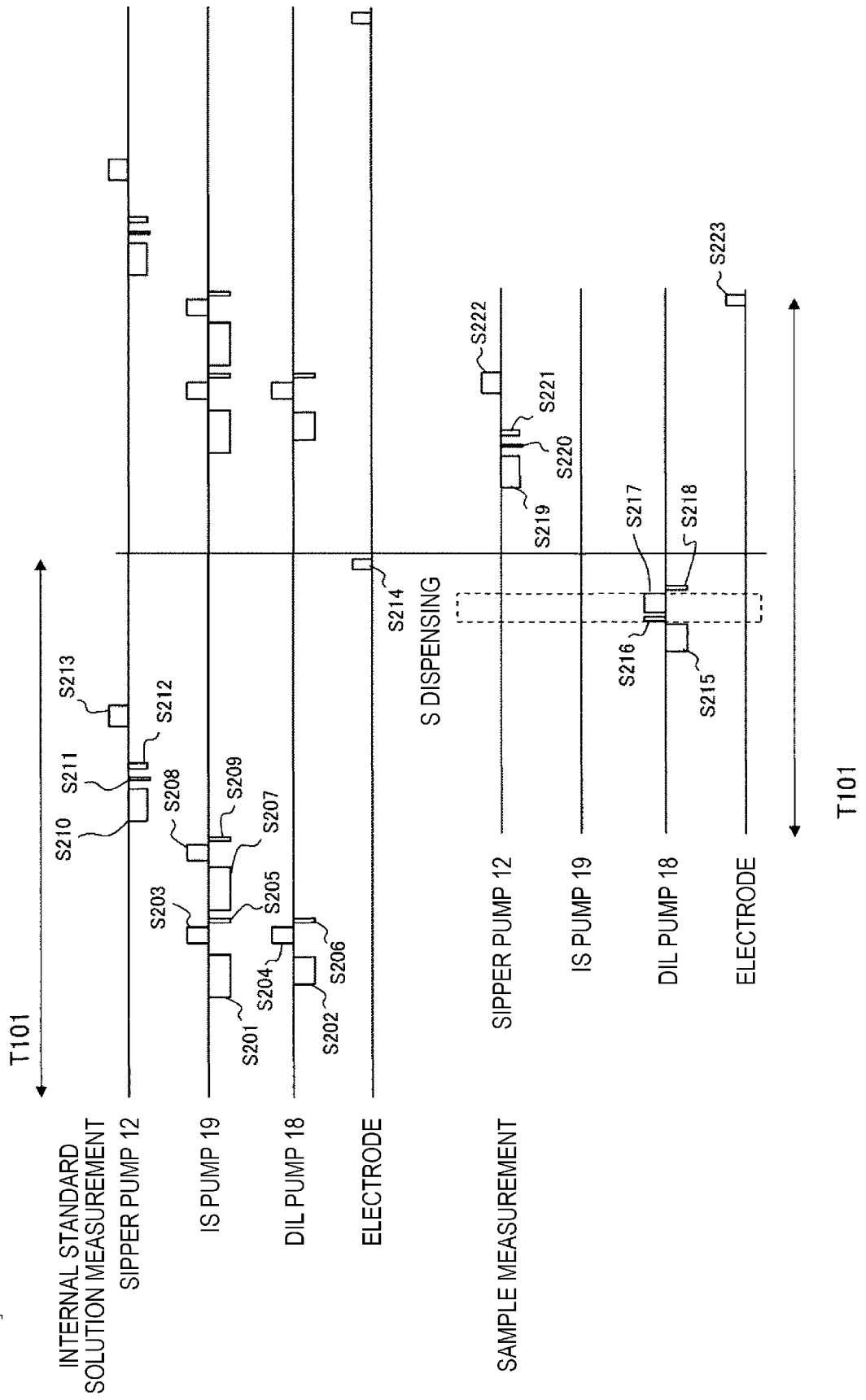
[FIG. 4]

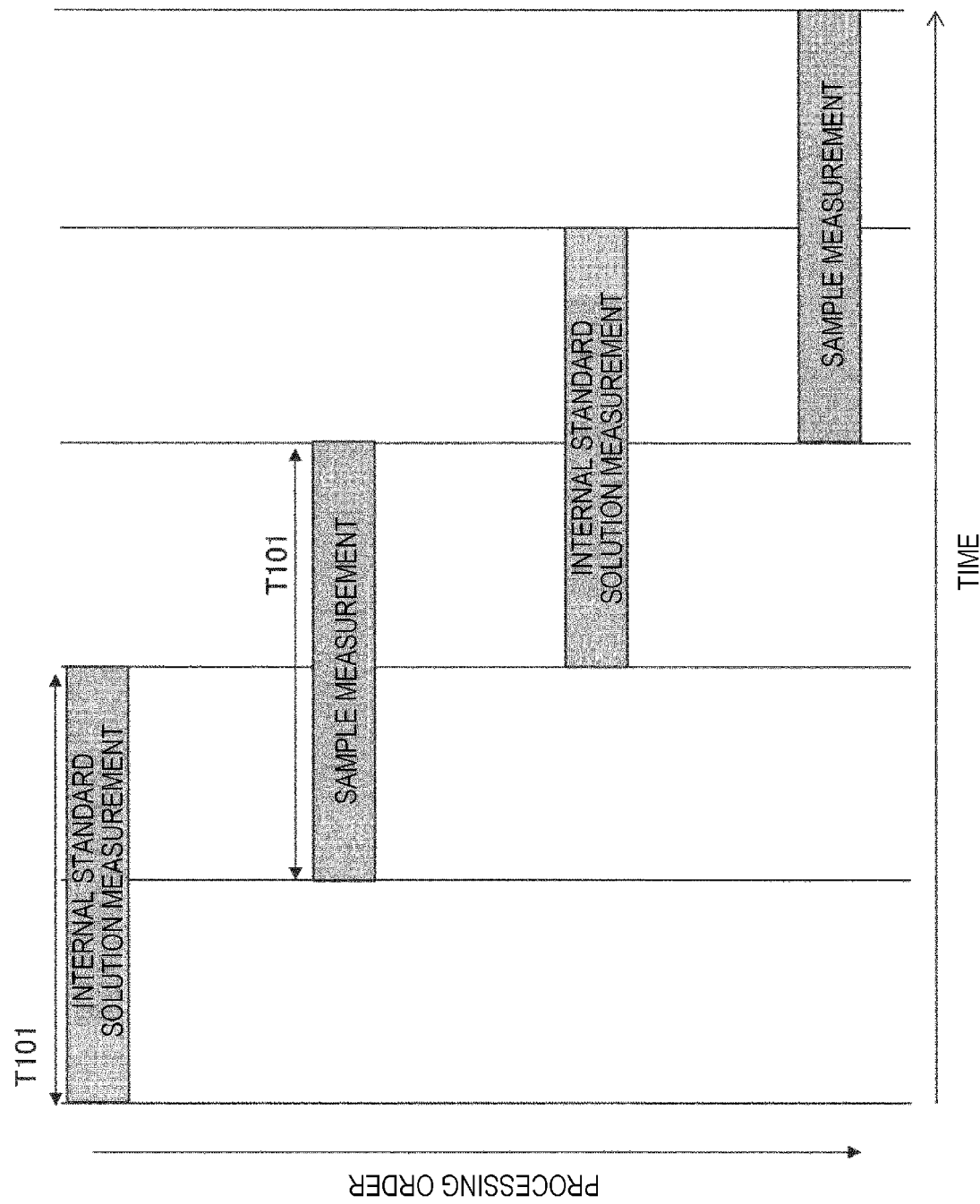
[FIG. 5]

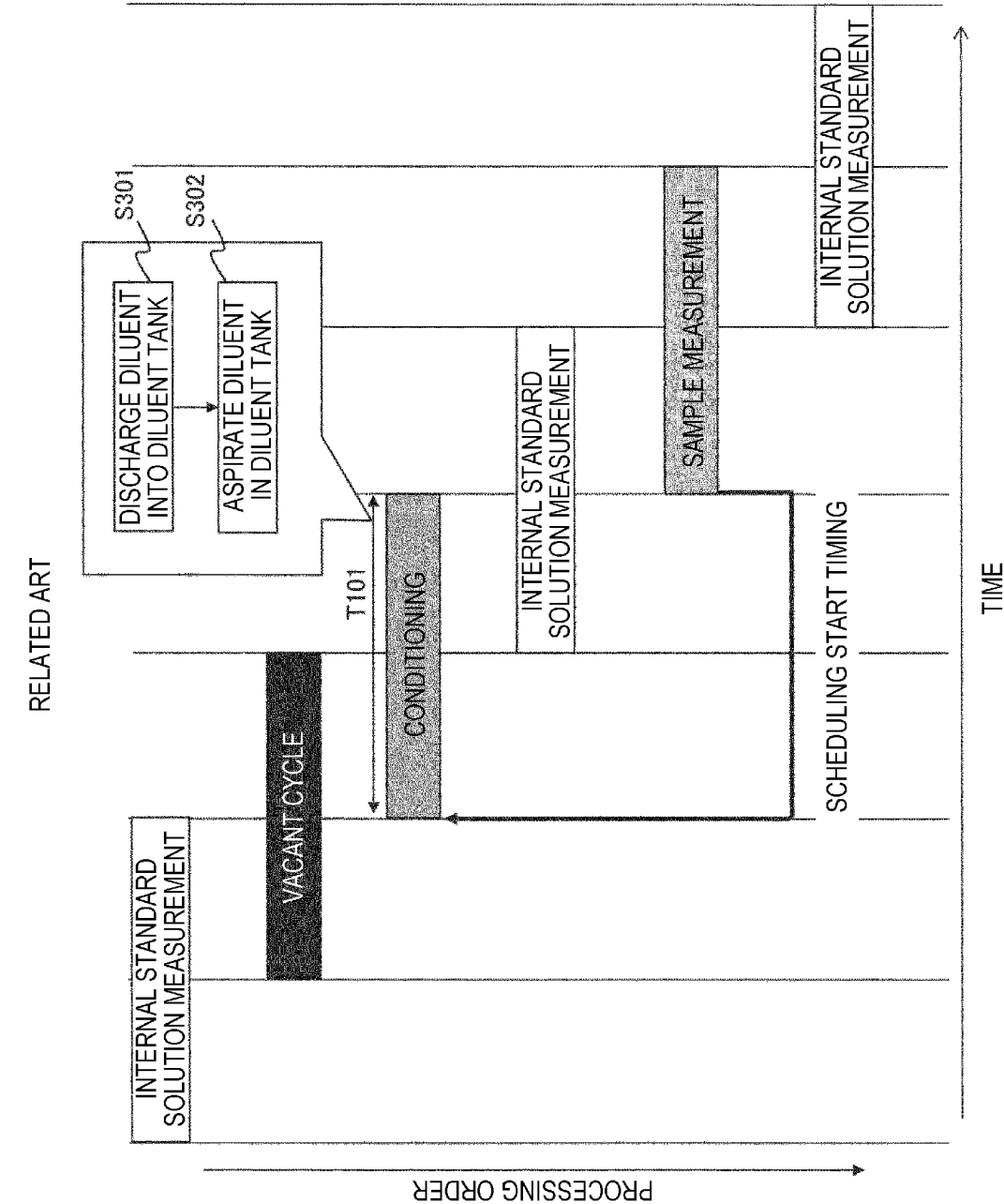
[FIG. 6]

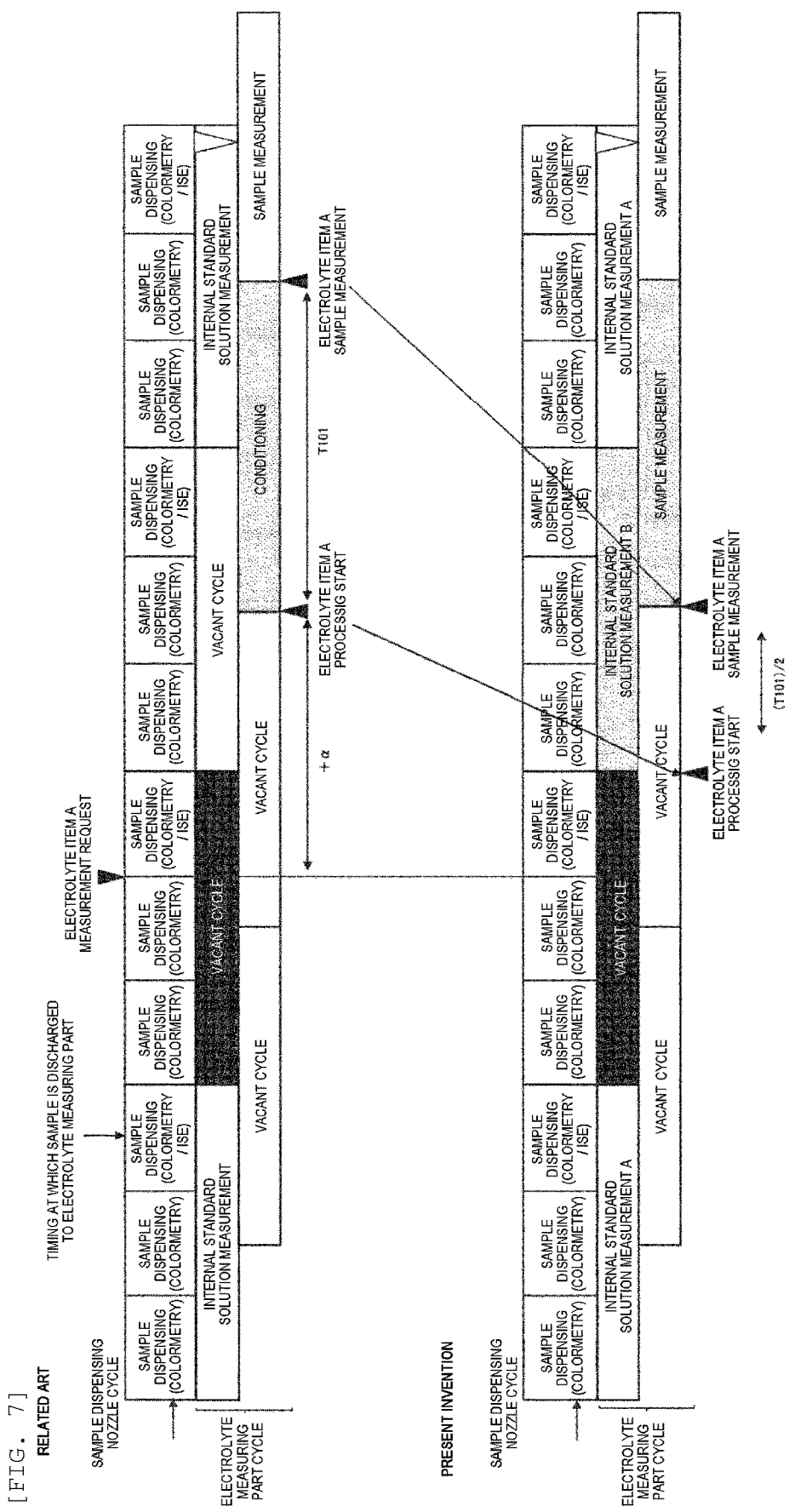

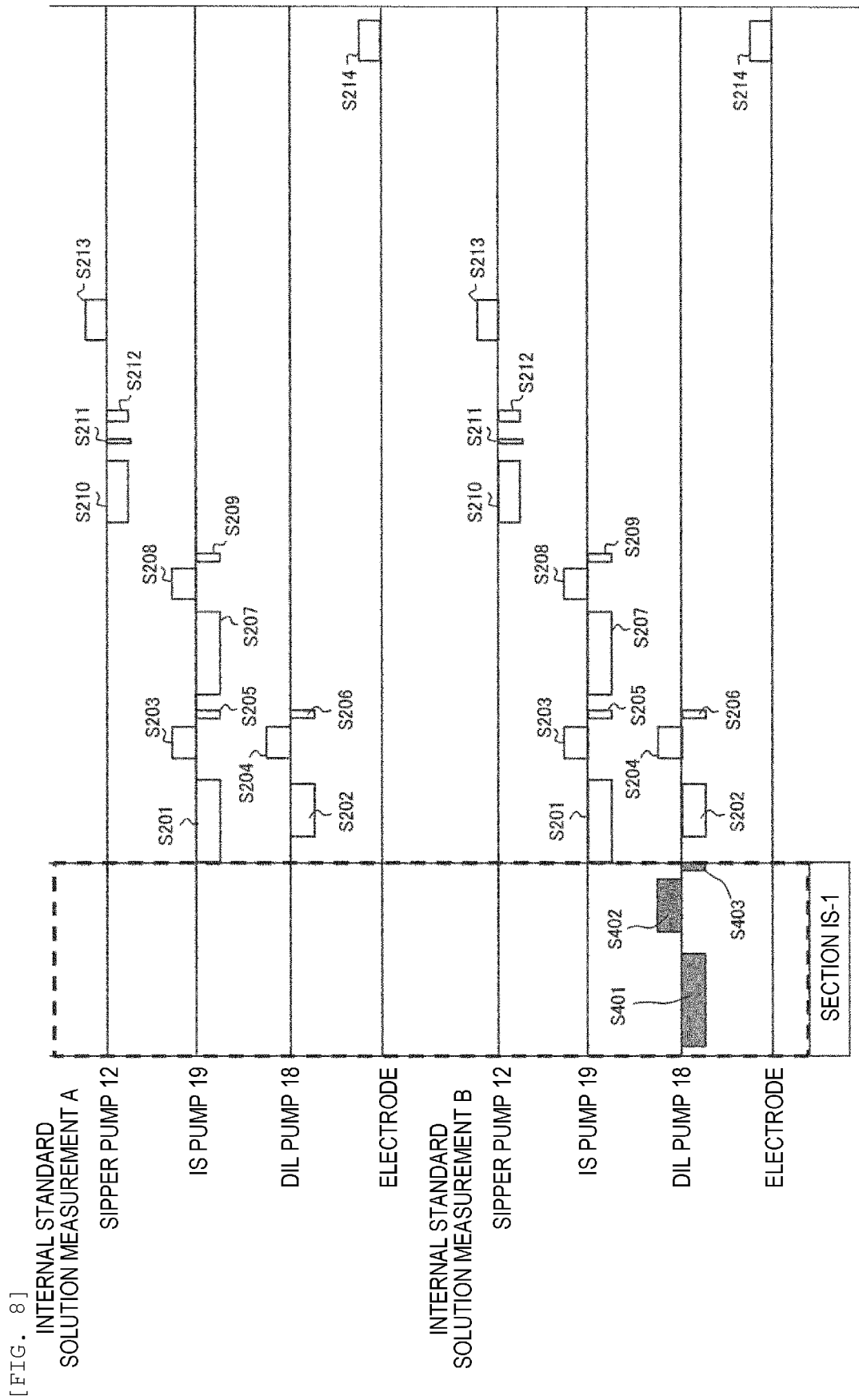
[FIG. 8]

[FIG. 9]

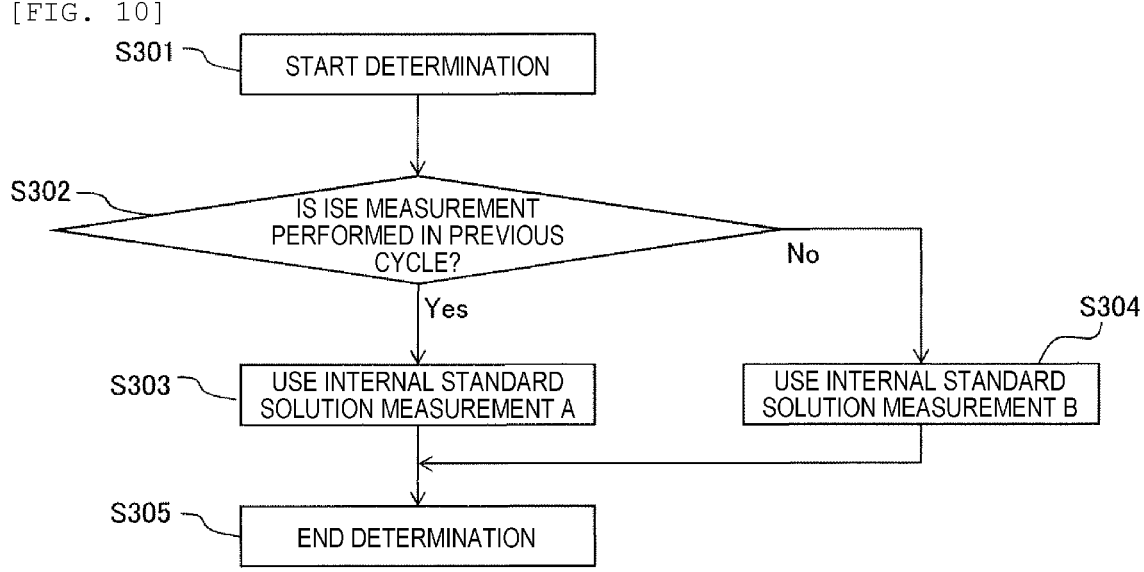
[FIG. 10]

[FIG. 11]
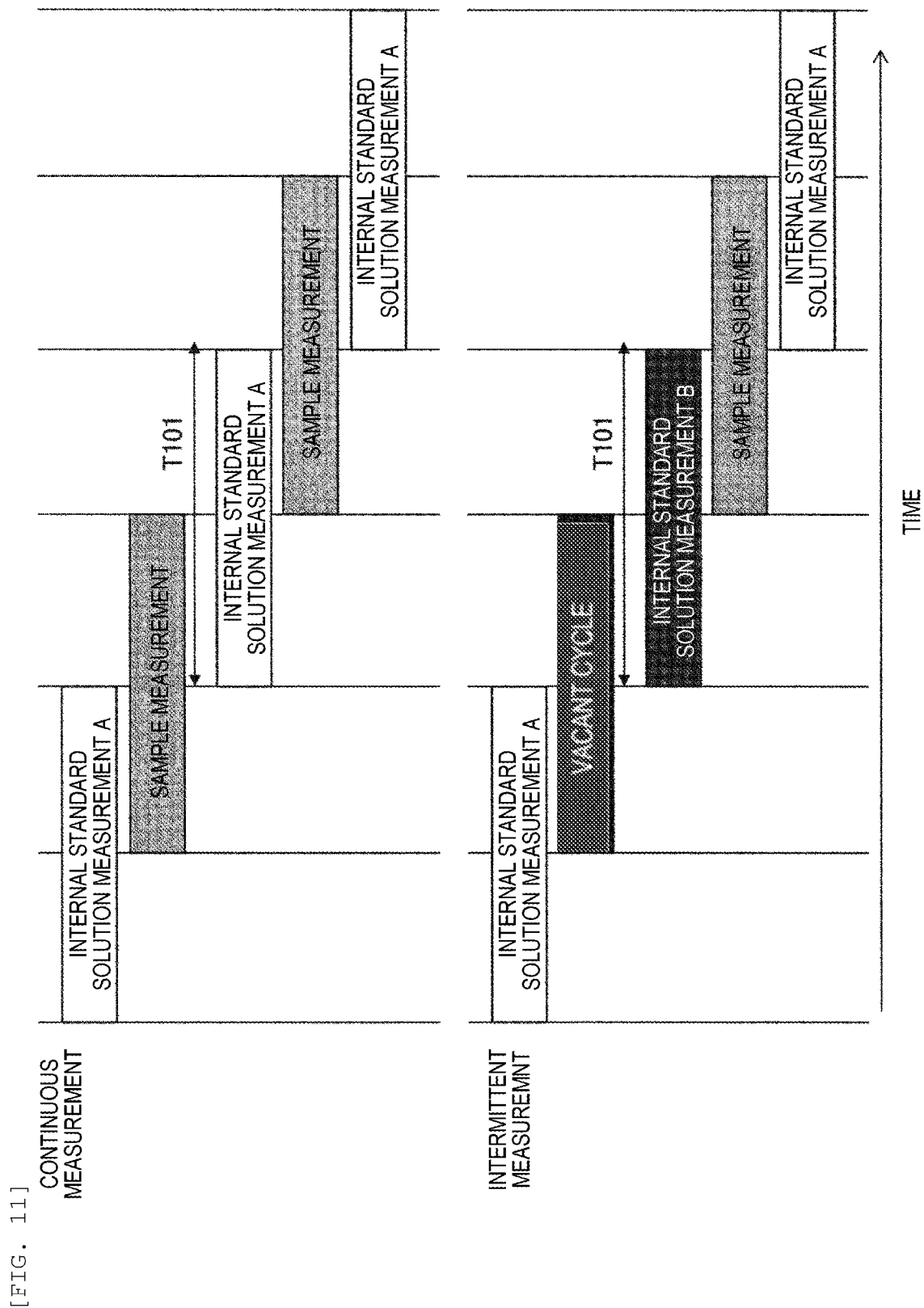

AUTOMATED ANALYZER, AUTOMATIC ANALYSIS SYSTEM, AND AUTOMATIC SAMPLE ANALYSIS METHOD

TECHNICAL FIELD

The present invention relates to an automated analyzer that measures the concentration or the activity value of a target component in a biological sample such as blood or urine, an automatic analysis system, and an automatic analysis method, and particularly to the automated analyzer on which an electrolyte analysis unit is mounted based on ion-selective electrodes, the automatic analysis system, and the automatic analysis method of the sample.

BACKGROUND ART

JP-A-2007-057367 (PTL 1) discloses an example of an electrolyte measuring device with high reliability for measurement data, which is not influenced by the ambient temperature, the electrolyte measuring device including a diluent tank that can dilute a sample or an internal standard solution with a discharged diluent, a cup holder that stores the diluent tank, an internal standard solution syringe that dispenses the internal standard solution to the diluent tank, a diluent syringe that dispenses the diluent to the diluent tank, an internal standard solution nozzle that discharges the internal standard solution, a diluting nozzle that discharges the diluent, a sipper nozzle that aspirates an electrolyte solution diluted for measurement, an electrolyte measuring part that performs quantitative analysis on electrolyte concentration of the aspirated electrolyte solution, and a vacuum aspiration nozzle that aspirates a remaining solution, and further discloses that the diluent tank, the electrolyte solution in the diluent tank, and the electrolyte measuring part are configured to be thermostatically controlled to maintain a constant temperature, particularly, that the sipper nozzle is immersed in the solution discharged to the diluent tank after a conditioning operation at the time of operation start is completed until electrolyte item measurement starts.

CITATION LIST

Patent Literature

PTL 1: JP-A-2007-057367

SUMMARY OF INVENTION

Technical Problem

An automated analyzer is a device that analyzes a biological sample such as blood, urine, and cerebrospinal fluid.

When the concentration of an electrolyte (ions such as Na, K, and Cl) in a sample of the automated analyzer is measured, a flow-type electrolyte concentration measuring device using an ion-selective electrode (ISE) is used as a typical method.

The electrolyte concentration measuring device measures the difference between a potential shown in the ion-selective electrode and a potential shown in a reference electrode (potential difference) to measure various ion concentration in the sample. Since this potential measurement greatly fluctuates according to the temperature, the temperature management during the measurement is important.

In particular, in clinical inspections, it is highly necessary to quantify the concentration of electrolytes included in the blood, which is a biological sample, particularly in a sample such as serum, plasma, and urine, and high precision is required for measurement data.

There is a dilution method as one of the electrolyte measurements. The dilution method is advantageous in that the consumption amount of a specimen is small because a required amount of the sample solution is small. In addition, the dilution method is also greatly advantageous in that concentration of coexisting substances such as proteins and lipids in a measuring solution is low, the influence of stains by coexisting substances is less, and ISE stability is high.

Therefore, the combination of the flow cell type ISE and the dilution method is currently the mainstream in the automatic electrolyte analyzer.

As described above, in the electrolyte measurement, the temperature management during the potential measurement by the electrode is very important. On the other hand, in the flow type electrolyte measurement, a liquid such as a mixture of a diluent and a sample or an internal standard liquid is flowed in the flow path. Therefore, when the liquid flows through the electrode flow path, there is a problem that the temperature during the potential measurement fluctuates according to the temperature of the liquid.

In order to solve the problem, the automated analyzer is provided with a buffer mechanism (preheat) in which the temperature of the reagent is controlled in advance before the reagent is discharged into the dilution tank.

In a case where the electrolyte is measured without interruption, since the sample diluent of which the temperature is managed and the internal standard solution are alternately and intermittently measured, liquid of which the temperature is managed always is in a state of moving in a reagent flow path or an electrode flow path, and thus it is easy to maintain the temperature during the potential measurement to be constant.

On the other hand, when there is an interval between the electrolyte measurements, the flow of the reagent stops there once. Therefore, the influence of the environmental temperature is easily received. Particularly, since each reagent discharge nozzle, the inside of a flow path from a reagent bottle to a buffer mechanism, and the like are portions where the temperature-controlled reagent does not flow, particularly the temperature change easily occurs.

Therefore, when there is an interval between the measurements, for the purpose of reducing the risk of bubble generation or the like due to reagent retention and controlling the temperature on a portion where the temperature change easily occurs, a dummy operation (conditioning operation) of intentionally flowing a temperature-controlled reagent by discharging an old reagent in the reagent flow path at the constant time interval and aspirating a new reagent is performed.

However, when this conditioning operation is performed, it is required that the device starts the operation before actually performing the sampling of the sample.

In the flow-type electrolyte measurement, three steps of (1) internal standard solution measurement, (2) sample measurement, and (3) internal standard solution measurement form one set of a sample measurement operation in many cases. Therefore, in order to actually perform the sample measurement, the internal standard solution measurement of (1) has to be started before the sampling starts. Also, if the conditioning operation is input, it is required to perform the scheduling even before the internal standard solution measurement of (1).

Therefore, due to scheduling, in the case of the operation of sequentially performing conditioning and the internal standard solution measurement, there is a problem in that, the start of the electrolyte measurement is delayed each time, and accordingly, the start of the colorimetric analysis is also delayed, to be led to the processing capacity decrease of the entire device.

In view of the above problems, the purpose of the present invention is to provide an automated analyzer in which the influence of an environmental temperature in electrolyte measurement can be reduced to secure measurement accuracy and the processing capacity of the entire device can be improved, an automatic analysis system, and an automatic analysis method of analyzing a sample.

Solution to Problem

The present invention includes a plurality of means for solving the problem, and an example thereof is an automated analyzer that automatically analyzes a sample includes: a sample dispensing nozzle that dispenses the sample; and an electrolyte measuring part that measures an internal standard solution once or more at least before measuring a potential of the sample, in which the operation of measuring the internal standard solution before measuring the potential is differentiated between a case where the electrolyte measuring part continuously measures the potential of the sample without a vacant cycle and a case where there is the vacant cycle without continuously measuring the potential of the sample.

Advantageous Effects of Invention

According to the present invention, the influence of an environmental temperature in electrolyte measurement can be reduced to secure measurement accuracy and the processing capacity of the entire device can be improved. Problems, configurations, and effects other than those described above are clarified by the description of the following embodiments.

BRIEF DESCRIPTION OF DRAWINGS

FIG. 1 is a diagram schematically illustrating an overall configuration of an automatic analysis system according to an embodiment of the present invention.

FIG. 2 is a diagram schematically illustrating an electrolyte measuring part in the automatic analysis system according to the embodiment.

FIG. 3 is a flowchart illustrating the flow of an electrolyte concentration measurement that is performed by the electrolyte measuring part in the automatic analysis system according to the embodiment.

FIG. 4 is a diagram illustrating the summary of operation time charts of an internal standard solution measurement and a sample measurement when the electrolyte measuring part in the automatic analysis system according to the embodiment continuously performs the measurement.

FIG. 5 is a diagram illustrating the summary of a series of processing order of the internal standard solution measurement and the sample measurement when the electrolyte measuring part in the automatic analysis system according to the embodiment continuously performs the measurement.

FIG. 6 is a diagram illustrating the summary of a series of processing order of an internal standard solution measurement and a sample measurement in an electrolyte measuring part in an automatic analysis system of the related art for comparison.

FIG. 7 is a diagram illustrating the summary of processing orders of the measuring unit in the automatic analysis system according to the embodiment and a measuring unit in an automatic analysis system of the related art.

FIG. 8 is a diagram illustrating two internal standard solution measurement sequences of the electrolyte measuring part in the automatic analysis system according to the embodiment.

Figure 9:
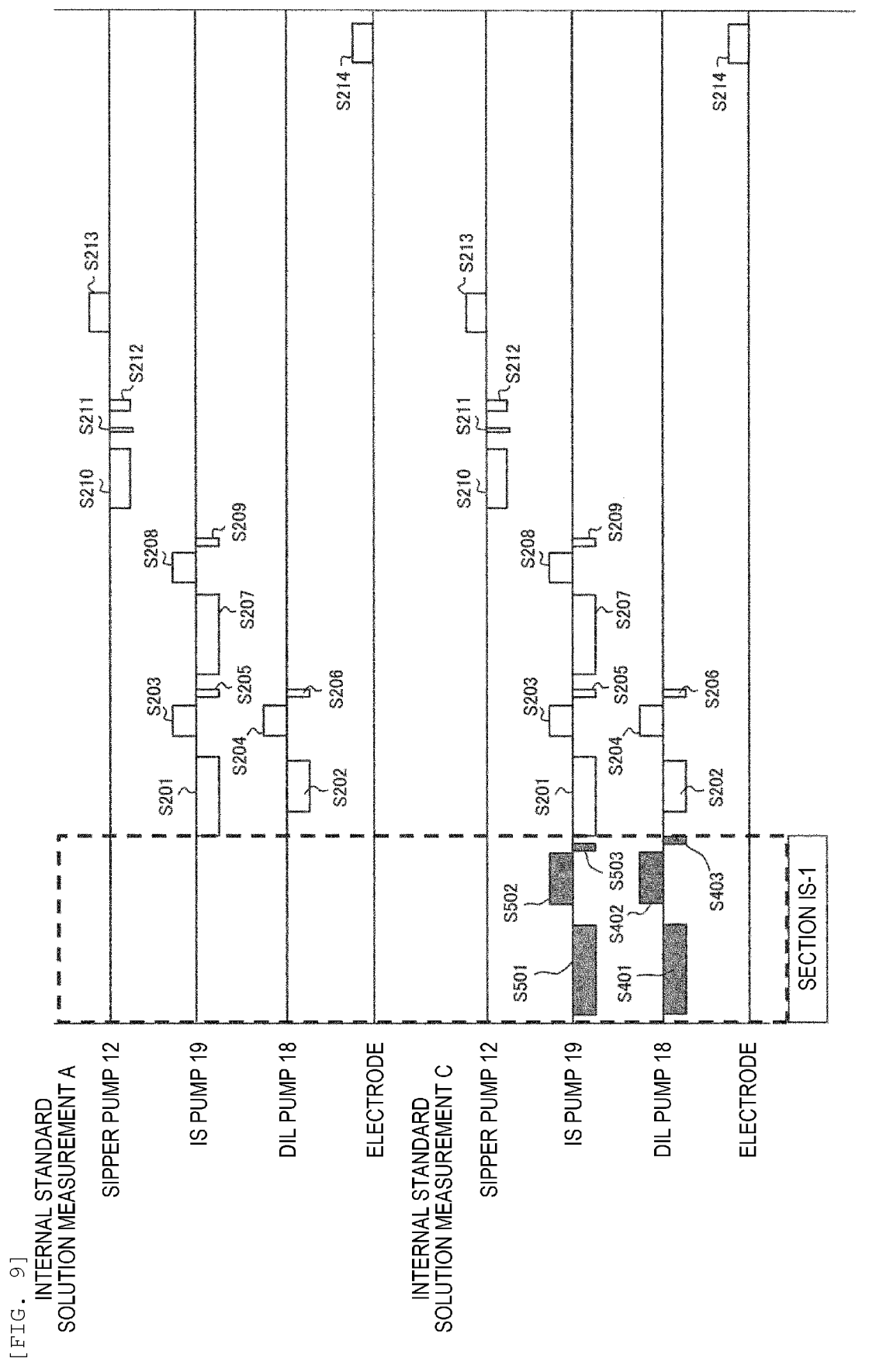

FIG. 9 is a diagram illustrating other internal standard solution measurement sequences of the electrolyte measuring part in the automatic analysis system according to the embodiment.

FIG. 10 is a flowchart illustrating a procedure of determining an operation of the electrolyte measuring part in the automatic analysis system according to the embodiment.

FIG. 11 is a diagram illustrating the summary of a series of processing order of the internal standard solution measurement and the sample measurement in the two internal standard solution measurement sequences in the electrolyte measuring part of the automatic analysis system according to the embodiment.

DESCRIPTION OF EMBODIMENTS

Embodiments of an automated analyzer, an automatic analysis system, and an automatic analysis method of analyzing a sample according to the present invention are described with reference to FIGS. 1 to 11.

First, the overall configuration of the automatic analysis system and the operation thereof according to the embodiment are described with reference to FIG. 1. FIG. 1 is a diagram schematically illustrating an overall configuration of an automatic analysis system according to the embodiment.

An automatic analysis system 100 illustrated in FIG. 1 includes a transport unit 101 that supplies a sample to an analysis unit 111, the analysis unit 111, and an operation unit 130.

The transport unit 101 is a unit for putting a sample rack 104 on which one or more sample containers containing biological samples to be analyzed such as blood or urine are mounted into the automatic analysis system 100, collecting the sample rack, transporting the sample rack into the automatic analysis system 100, and supplying the sample to the analysis unit 111.

The transport unit 101 includes a rack buffer 103, a rack supply tray 102, a rack housing tray 107, and a transport line 106.

In the transport unit 101, the sample rack 104 installed on the rack supply tray 102 is transported to the rack buffer 103 by the transport line 106. In the middle of the transport line 106, a sensor for sample presence determination (not illustrated) is provided, and the presence of the sample container on the sample rack 104 is recognized. Here, if it is determined that the sample container is present, a sample barcode (not illustrated) attached onto the sample container is read by the sample barcode reader (not illustrated), and the identification information of the sample is recognized. In the actual automatic analysis system 100, the patient is specified by the identification information.

The rack buffer 103 has a rotor structure that performs circular motion and has slots for radially holding the plurality of sample racks 104 on which a plurality of sample containers are placed on the outer circumference. By rotating this slot with a motor, the arbitrary sample rack 104 is configured to be carried into and out of the analysis unit 111 of the request destination. Due to such a structure, the sample rack 104 introduced first may not be necessarily processed sequentially. That is, if the sample rack 104 with a high priority is present, the sample rack 104 can be processed first.

The transport line 106 is connected to a certain point on the radial circumference of the rack buffer 103, and the sample rack 104 is carried in and out. It is assumed that this one point is set to a position of 0 degrees on the circumference, a sample dispensing line 112 for drawing into the analysis unit 111 described below is connected at a position of 90 degrees on the circumference from the position where the transport line 106 is connected, and the sample rack 104 is carried in or out.

The sample rack 104 that is dispensed by the analysis unit 111 can wait for the output of the measurement result in the rack buffer 103 and can be subjected to processing such as automatic re-examination, if necessary. When the processing is completed, the sample rack 104 is transported to the rack housing tray 107 via the transport line 106.

The analysis unit 111 is a unit for performing measurement operations of requested measurement items on the sample and outputting measurement results and is connected to the transport unit 101.

This analysis unit 111 includes a reaction disk 115, a reagent disk 117, the sample dispensing line 112, a reagent dispensing nozzle 116, a sample dispensing nozzle 2, a colormatric determining unit 118, and an electrolyte measuring part 114.

Reaction containers (not illustrated) are arranged on the circumference of the reaction disk 115. The sample dispensing line 112 into which the sample rack 104 with the sample containers is carried is installed near the reaction disk 115.

The sample dispensing nozzle 2 that can rotate and move up and down is installed between the reaction disk 115 and the sample dispensing line 112. The sample dispensing nozzle 2 moves while drawing an arc about the rotation axis, and dispenses the sample from the sample rack 104 to the reaction container on the reaction disk 115, or a diluent tank 1 in the electrolyte measuring part 114 (see FIG. 2).

The reagent disk 117 is a storage in which a plurality of reagent bottles (not illustrated) containing reagents can be placed on the circumference. The reagent disk 117 is kept cold.

The reagent dispensing nozzle 116 that can rotate and move up and down is installed between the reaction disk 115 and the reagent disk 117. The reagent dispensing nozzle 116 moves while drawing an arc about the axis of rotation, accesses the inside of the reagent disk 117 from the reagent dispensing nozzle aspiration port, and dispenses the reagent from the reagent bottle to the reaction container.

Further, cleaning tanks (not illustrated) are installed in the operation ranges of the reagent dispensing nozzle 116 and the sample dispensing nozzle 2, respectively.

The electrolyte measuring part 114 and the colormatric determining unit 118 are disposed around the reaction disk 115.

The electrolyte measuring part 114 is an analyzing part that measures the electrolyte concentration in the sample using an ion selective electrode. Details thereof are described below by using FIG. 2.

The colormatric determining unit 118 is an analyzing part that measures the absorbance of the reaction liquid generated by mixing and reacting in a reaction container on the reaction disk 115 and analyzes the biochemical components in the sample, and the electrolyte measuring part 114 analyzes different analysis items of the measurement principle.

The colormatric determining unit 118 includes a light source, a spectrophotometer, and the like.

This colormatric determining unit 118 shares the electrolyte measuring part 114 and the sample dispensing nozzle 2. In the embodiment, the operation cycle time of the sample dispensing nozzle 2 is the same as the operation cycle time of the colormatric determining unit 118 and is different from the operation cycle time of the electrolyte measuring part 114.

The operation unit 130 is a portion that plays a role of controlling the information of all units of the entire automatic analysis system 100, and includes a display part 131, an input part 132, a recording part 133, and an overall control unit 134. The operation unit 130 is connected to the analysis unit 111 or the transport unit 101 by a wired or wireless network line.

The display part 131 is a portion on which various screens such as an operation screen for ordering a measurement item for measuring a sample to be measured and a screen for confirming the measurement result are displayed and is configured with a liquid crystal display or the like. The display part 131 does not have to be a liquid crystal display, may be replaced with a printer or the like, or may be configured with a display, a printer, or the like.

The input part 132 is a portion for inputting various parameters, settings, measurement results, measurement request information, analysis start or stop instructions, and the like based on the operation screen displayed on the display part 131.

The recording part 133 is a portion for storing time charts or operation parameters necessary for the operation of each device that configures the automatic analysis system 100, various information for specifying biological samples, measurement results, and the like, and is configured with a storage medium such as a semiconductor memory such as a flash memory or a magnetic disk such as an HDD.

The overall control unit 134 is a portion for controlling operations of the entire automatic analysis system 100, and includes a control unit for transport unit 134a, a control unit for analysis unit 134b, and a calculation recording part 134c.

The control unit for transport unit 134a controls an operation of transporting the sample rack 104 appropriate for the sample dispensing line 112 from the rack buffer 103 or a transport operation of returning the sample rack 104 from the sample dispensing line 112 to the rack buffer 103.

The control unit for analysis unit 134b is connected to each device in the above-described the analysis unit 111 and controls analysis operations by each configuration device of the electrolyte measuring part 114 or the colormatric determining unit 118.

The calculation recording part 134c calculates ion concentration of the measurement target from the measured potential in the electrolyte measuring part 114 together with calculating the concentration of a specific component in the measurement target from the measured absorbance or the like in the colormatric determining unit 118.

The control unit for transport unit 134a, the control unit for analysis unit 134b, and the calculation recording part 134c of the overall control unit 134 may be realized by using a general-purpose computer, or may be realized as functions of programs executed on the computer.

That is, processes of the control unit for transport unit 134a, the control unit for analysis unit 134b, and the calculation recording part 134c may be stored as program codes in a recording unit such as a memory and may be realized by executing the program codes by a processor such as a central processing unit (CPU).

The control unit for transport unit 134a, the control unit for analysis unit 134b, and the calculation recording part 134c may be configured with hardware such as a dedicated circuit board.

According to the embodiment, a case where an analyzing part provided together with the electrolyte measuring part 114 at the same time is the colormatric determining unit 118 is described, but the analyzing part is not limited to the colormatric determining unit that measures a biochemical item, and for example, a measuring unit that measures immune items and the electrolyte measuring part 114 can be disposed in the same analysis unit.

A case where the automatic analysis system 100 includes one analysis unit 111 is described, but can include two or more analysis units. In this case, the type of the analysis unit is not particularly limited, and each of various analysis units such as biochemical analysis units, immunoanalysis units, and blood coagulation analysis units can be provided by one or more.

A case where the automatic analysis system 100 includes the transport unit 101 is described, but the transport unit is not required to be provided, the automated analyzer can be configured with an analysis unit and an operation unit.

Subsequently, the summary of the mechanical operation of the automatic analysis system 100 illustrated in FIG. 1 is described.

The transport unit 101 sends out the sample racks 104 installed in the rack supply tray 102 of the automatic analysis system 100 onto the transport line 106 by one rack by one and carries the sample racks 104 into the rack buffer 103. The sample racks 104 transported to the rack buffer 103 is transported to the sample dispensing line 112 of the analysis unit 111.

If the sample rack 104 is arrived to the sample dispensing line 112, the dispensing operation is performed by the sample dispensing nozzle 2 to each sample mounted on the sample racks 104 according to the measurement items requested by the operation unit 130.

When the measurement item is a biochemical item, the sample dispensing nozzle 2 discharges the aspirated sample to the reaction container on the reaction disk 115, further adds the reagent aspirated from the reagent disk 117 by the reagent dispensing nozzle 116 to the reaction container, and stirs the resultant. Thereafter, the absorbance is measured by the colormatric determining unit 118, and the measurement result is transmitted to the calculation recording part 134c of the operation unit 130.

When the requested measurement item is an electrolyte item, the sample dispensing nozzle 2 discharges the aspirated sample to the diluent tank 1 of the electrolyte measuring part 114, the electromotive force is measured by ion selective electrodes 7, 8, and 9, and the measurement results are transmitted to the calculation recording part 134c of the operation unit 130. However, in a case of measuring the electrolyte item, as described above, a pre-measurement operation is required to measure the electromotive force of the internal standard solution of known concentration before the sample is dispensed as described above.

The calculation recording part 134c of the operation unit 130 requires the concentration of the specific component in the sample by a calculation process from the transmitted measurement result. The analysis result is notified to the user via the display part 131 and is recorded in the recording part 133.

Subsequently, a summary of the electrolyte measuring part using an ion selective electrode is described with reference to FIG. 2. FIG. 2 is a schematic diagram illustrating an example of the electrolyte measuring part using the ion selective electrode.

The electrolyte measuring part 114 is disposed in the analysis unit 111 that automatically analyzes the sample.

The electrolyte measuring part 114 includes the diluent tank 1, a diluent dispensing nozzle 3, an internal standard solution dispensing nozzle 4, a sample liquid aspiration nozzle 5, a pipe 6, the sodium ion selective electrode 7, the potassium ion selective electrode 8, the chlorine ion selective electrode 9, a reference electrode 10, a pipe 11, a sipper pump 12, a potential measuring part 13, a temperature control unit 16, and the like.

The sample dispensing nozzle 2 dispenses and discharges a sample such as blood or urine to the diluent tank 1, and the diluent dispensing nozzle 3 dispenses and discharges the diluent to the diluent tank 1. The internal standard solution dispensing nozzle 4 dispenses and discharges the internal standard solution to the diluent tank 1.

The diluent is sent to the diluent dispensing nozzle 3 from a diluent container 14 by using a pump for diluent (DIL pump) 18. An internal standard solution is sent from an internal standard solution container 15 to the internal standard solution dispensing nozzle 4 by using a pump for internal standard solution (IS pump) 19.

The temperature control unit 16 is disposed in a flow path of the diluent and the internal standard solution, and the temperature thereof is controlled to a constant temperature (for example, 37° C.) while each solution is sent. The flow path near the temperature control unit 16 can increase the temperature control efficiency by increasing the flow path volume than that in the other portions.

The sample liquid aspiration nozzle 5 is configured to be movable up and down and aspirates the solution in the diluent tank 1 by the driving force of the sipper pump 12. The aspirated solution is introduced into the flow paths of the ion selective electrodes 7, 8, and 9 via the pipe 6 and further wasted via the pipe 11.

In the electrolyte measuring part 114, as a sample introduction part that introduces the sample liquid including the electrolyte, the sample liquid aspiration nozzle 5, the pipe 6, the pipe 11, and the sipper pump 12 are used. By using this sample introduction part, the sample liquid is introduced into the flow paths of the ion selective electrodes 7, 8, and 9.

Further, by the pipe 11 and the sipper pump 12, the reference electrode liquid is introduced from a reference electrode liquid container 17 to the reference electrode 10. The reference electrode liquid is substituted from the internal standard solution in the ion selective electrodes 7, 8, and 9 or the like to another flow path, by using a valve or the like so as not to contaminate with the internal standard solution.

The respective terminals of the ion selective electrodes 7, 8, and 9 and the reference electrode 10 are connected to the potential measuring part 13, and the potential difference between the electrodes is measured in a state in which the sample liquid is introduced.

As described above, in the potential measurement operation of the sample in the electrolyte measuring part 114, it is required to measure the internal standard solution. However, in the embodiment, the operation of measuring the internal standard solution before measuring the potential is changed between a case where the electrolyte measuring part 114 continuously measures the potential of the sample and a case where there is an interval between the measurements without continuously measuring the potential.

Particularly, in the embodiment, a first time chart that is a time chart in a case where the potential of sample is continuously measured, and that is provided with a vacant time when the electrolyte measuring part 114 does not operate at the beginning of the time chart, and a second time chart that is a time chart in a case where the potential of sample is not continuously measured, and that is defined so that an operation of discharging or aspirating at least any one of the internal standard solution and the diluent for diluting the sample is performed without being provided with a vacant time when the electrolyte measuring part 114 does not operate at the beginning.

In other words, when the sample is measured by the electrolyte measuring part 114 of the embodiment, in the operation of measuring the internal standard solution, in the first time chart in a case where the potential is continuously measured, an operation of discharging and aspirating at least anyone of the internal standard solution and the diluent for diluting the sample, which is performed when there is the interval is not performed, the measuring of the internal standard solution is started after a period of time required for these operations.

In contrast, in the second time chart in a case where the measurement of the potential of the sample by the electrolyte measuring part 114 is not continuously performed and there is an interval between the measurements, at the timing before the operation of measuring the internal standard solution corresponding to the vacant time of the first time chart, an operation of discharging and aspirating at least any one of the internal standard solution and the diluent for diluting the sample is performed.

The time chart for controlling these operations is stored in the recording part 133 and is executed by the control unit for analysis unit 134b of the overall control unit 134.

FIG. 3 is an example of a flowchart for measuring electrolyte concentration by using the electrolyte concentration measuring device of FIG. 2. The processing of FIG. 3 is mainly controlled by the control unit for analysis unit 134b of the overall control unit 134.

As illustrated in FIG. 3, first, the internal standard solution is discharged to the diluent tank 1 by using the internal standard solution dispensing nozzle 4 (Step S101).

Subsequently, the internal standard solution in the diluent tank 1 is aspirated by using the sample liquid aspiration nozzle 5 and the sipper pump 12 (Step S102). Accordingly, the flow paths of the ion selective electrodes 7, 8, and 9 are filled with the internal standard solution.

Subsequently, the potentials of the ion selective electrodes 7, 8, and 9 with reference to the reference electrode 10 are measured by using the potential measuring part 13 (Step S103). The potential of the ion selective electrodes 7, 8, and 9 herein is set as E1.

Subsequently, the sample is discharged to the diluent tank 1 by using the sample dispensing nozzle 2 (Step S104).

Subsequently, the diluent is discharged to the diluent tank 1 by using the diluent dispensing nozzle 3 (Step S105). Accordingly, the sample is diluted so that the sample amount and the diluent amount are in the set ratio.

Subsequently, the diluted sample in the diluent tank 1 is aspirated by using the sample liquid aspiration nozzle 5 and the sipper pump 12 (Step S106). Accordingly, the flow paths of the ion selective electrodes 7, 8, and 9 are filled with the sample liquid.

Subsequently, the potential of the ion selective electrodes 7, 8, and 9 with reference to the reference electrode is measured by using the potential measuring part (Step S107). The potential of the ion selective electrodes 7, 8, and 9 herein is set to E2.

Subsequently, the ion concentration of the measurement target in the sample is calculated from the potentials E1 and E2 measured in advance by the calculation recording part 134c (Step S108) and is output to the recording part 133, the display part 131, or the like (Step S109).

Thereafter, the internal standard solution is discharged to the diluent tank 1 again (Step S101), and the internal standard solution in the diluent tank 1 is aspirated (Step S102), to complete the measurement.

In a case of the first time chart in which the electrolyte is continuously measured, Steps S101 to S109 are repeated.

FIG. 4 is a summary of an operation time chart of the internal standard solution measurement and the sample measurement during the continuous measurement.

As illustrated in FIG. 4, first, in the internal standard solution measurement, the pump for internal standard solution 19 performs the aspiration operation and prepares for the discharge of the internal standard solution to the diluent tank 1 (Step S201). The aspiration amount is the setting of the system 100 and is, for example, 355 [μL].

Subsequently, the pump for diluent 18 performs the aspiration operation and prepares for the discharge to the diluent tank 1 (Step S202). The aspiration amount in this case is also the setting of the system 100 and is, for example, 330 [μL].

Thereafter, predetermined amounts of the internal standard solution and the diluent are discharged (Steps S203 and S204). The discharge amount in this case is the setting of the system 100. For example, the discharge amount of the internal standard solution is 220 [μL], and the discharge amount of the diluent is 330 [μL].

Thereafter, in order to prevent dripping from the nozzle tip, both of the diluent dispensing nozzle 3 and the internal standard solution dispensing nozzle 4 aspirate the air (Steps S205 and S206). The above is an operation of cleaning the diluent tank before the internal standard solution is measured.

Subsequently, the internal standard solution is aspirated by the pump for internal standard solution 19 (Step S207). The aspiration amount in this case is also the setting of the system 100 and is, for example, 365 [μL]. Thereafter, the internal standard solution is discharged to the diluent tank 1 by the pump for internal standard solution 19 (Step S208). The aspiration amount in this case is also the setting of the system 100 and is, for example, 500 [μL]. After the internal standard solution is discharged, in order to prevent dripping from the nozzle, the air is aspirated from the internal standard solution dispensing nozzle 4 by using the pump for internal standard solution 19 (Step S209).

Subsequently, the internal standard solution discharged to the diluent tank 1 is drawn into the flow paths of the ion selective electrodes 7, 8, and 9 by using the sipper pump 12 (Step S210). Thereafter, in order to prevent dripping, the air is aspirated from the sample liquid aspiration nozzle 5 by using the sipper pump 12 (Step S211).

Thereafter, in order to measure the potential of the reference electrode liquid, the operation of aspirating the reference electrode liquid is performed by the sipper pump 12 (Step S212). Accordingly, the reference electrode 10 is filled with the reference electrode liquid.

After the series of operations are completed, the sipper pump 12 returns to the home position, and the liquid in the flow path is wasted (Step S213). Finally, the potential of the ion selective electrodes 7, 8, and 9 or the reference electrode 10 are obtained (Step S214).

Subsequently, the time chart during the sample measurement is described with reference to FIG. 4 in the same manner.

In the sample measurement, first, the aspiration operation for discharging the diluent is performed by the pump for diluent 18 (Step S215).

Subsequently, the diluent and the sample are discharged to the diluent tank 1. The diluent is discharged in two parts. After the diluent in the first part is discharged (Step S216), the sample is discharged, and the diluent in the second part is discharged (Step S217). The sample is discharged by using the sample dispensing nozzle 2. The ratio of the sample and the diluent is set by the device. Thereafter, in order to prevent dripping, the air is aspirated from the diluent dispensing nozzle 3 (Step S218).

Subsequently, the sample diluent in the diluent tank 1 is aspirated by the sipper pump 12 (Step S219). Thereafter, in order to prevent dripping, the air is aspirated from the sample liquid aspiration nozzle 5 (Step S220).

Thereafter, in order to measure the potential of the reference electrode liquid, the operation of aspirating the reference electrode liquid is performed by the sipper pump 12 (Step S221). After a series of operations are completed, the sipper pump 12 is returned to the home position and the liquid in the flow paths in each electrode is wasted (Step S222).

Finally, the potential of each electrode is obtained (Step S223).

Here, as illustrated in FIGS. 4 and 5, the sequence of the series of operations of the internal standard solution measurement and the sample measurement can be overlapped by adjusting the operation timing of each mechanism.

For example, as illustrated in FIG. 5, from cycle times T101 of the internal standard solution measurement or the sample measurement for measuring a certain sample, the latter half portion ½ of the internal standard solution measurement and the first half portion ½ of the sample measurement are overlapped and processed. Accordingly, the sample measurement can proceed in the cycle of T101, not T101×2 in total.

For example, when the electrolyte processing capacity of this device is 150 samples per one hour, the operation cycle of T101 is 24 seconds. That is, the time T102 required for measuring the sample is 24 seconds. In the same manner, the time T101 required for measuring the potential of the internal standard solution is also 24 seconds.

FIG. 6 illustrates a processing order of the time chart when there is a vacant cycle between the sample measurements of the automatic analysis system of the related art.

As illustrated in FIG. 6, in the automatic analysis system of the related art, when there is the vacant cycle, the conditioning operation is performed by using the time of the cycle time T101 of the device. This conditioning operation is mainly an operation of discharging the diluent to the diluent tank 1 and aspirating the discharged diluent with the sipper pump 12. Accordingly, the temperature decrease of the diluent dispensing nozzle 3 or the internal standard solution dispensing nozzle 4 is alleviated, and the temperature decrease of the sample liquid aspiration nozzle 5 is alleviated, and the temperature decrease of the container of the diluent tank 1 is alleviated. In addition, the adverse effects by the solution staying in the flow paths of the ion selective electrodes 7, 8, and 9 or the reference electrode 10, for example, the generation of bubbles, the deposition of solution components, mixing and diffusion of components from the flow path for the reference electrode liquid can be prevented. Further, it was attempted to prevent the precipitation of crystals from each solution in each nozzle and the diluent tank 1 due to the elapse of a long period of time.

When the conditioning operation is performed, in the automatic analysis system of the related art, before the sample measurement is actually performed, two processes of the conditioning and the measuring of the internal standard solution are performed, it is required to secure the time for the two processes. That is, as illustrated in FIG. 6, the sample measurement actually starts after the elapse of the time T101 from the scheduling of the process of the sample by the device. Therefore, whenever the vacant cycle is generated, the electrolyte measurement stands by for at least T101.

When the conditioning is not performed, only the internal standard solution is measured, and thus the waiting time is ½ of the time T101 until the sample measurement starts. However, the effect by the conditioning cannot be obtained, and thus it is concerned that there is influence on the analysis performance.

A case where the colormatric determining unit 118 and the electrolyte measuring part 114 are configured to share the sample dispensing nozzle 2 as illustrated in FIG. 1 is considered. In this case, it is general that the processing capacity of the colormatric determining unit 118 is higher.

Accordingly, the operation cycle of the sample dispensing nozzle 2 matches with the cycle of the colormatric determining unit 118. For example, the operation cycle of the sample dispensing nozzle 2 and the operation cycle of the electrolyte measuring part 114 operate at different cycles as illustrated in FIG. 7.

Therefore, in the device with such a configuration, the sample dispensing nozzle 2 cannot always discharge the sample to the electrolyte measuring part 114, and the sample for the electrolyte is dispensed at a limited timing in the cycle of the colormatric determining unit 118.

For example, as illustrated in FIG. 7, the electrolyte dispensing (ISE dispensing) is performed once at a predetermined timing during the colormatric determination is performed three times. Accordingly, when a request for an electrolyte item A is treated at the timing of a vacant cycle A as illustrated in FIG. 7, depending on the scheduling timing, the waiting time is generated until the next dispensing starts as in the device of the related art of FIG. 7, so that the waiting time of T101+α may be generated.

Generally, the processing order of the sample measurement is a flow in which the electrolyte measurement is performed first, and then the colorimetric analysis is performed. Therefore, whenever the request for the electrolyte measurement is interrupted, the vacant cycle is introduced to generate the waiting time of T101 or T101+α, and the process of the colorimetric analysis is delayed by that amount.

In response to such a problem, in order not to generate the conditioning waiting time, the automatic analysis system of the embodiment includes two time charts of the first time chart in a case where the potential of the sample is continuously measured and the second time chart in a case where the potential of the sample is not continuously measured, as the operation sequence.

The internal standard solution measurement sequence according to the present invention is illustrated in FIG. 8.

Internal standard solution measurement A illustrated in FIG. 8 corresponds to the above first time chart, and has the same operation sequence as the internal standard solution measurement and the operation order of each mechanism as illustrated in FIG. 4. The difference is that the vacant interval shown in a section IS-1 is secured before the process of measuring the internal standard solution is actually started.

This section IS-1 is preferably set to 15% to 20% of the time of the cycle T101 used for the internal standard solution measurement and is preferably secured in the first half of the operation sequence.

For example, as the section IS-1, the time of 4.4 seconds with respect to 24 cycles of the internal standard solution operation is secured. The time of the section IS-1 is the time when the conditioning corresponding operation described below can be performed.

Meanwhile, internal standard solution measurement B corresponds to the second time chart, and a diluent aspiration operation for discharging the diluent to the diluent tank 1 (Step S401), the diluent discharging operation for discharging the diluent to the diluent tank 1 (Step S402), and the air aspiration operation for prevent dripping from the diluent dispensing nozzle 3 (Step S403) are performed by using the section IS-1.

This is an operation that corresponds to the conditioning operations of Step S301, S302 of FIG. 6 and that can obtain the same effect to the analysis performances.

Here, discharging is performed so that the discharging amount of the diluent is larger than the discharging amount in the operations such as Steps S203, S204, and S208. Here, for example, the discharging of 600 [μL] is performed, and then the reagent aspiration operation is performed.

Further, the time chart for the internal standard solution measurement is not limited to the internal standard solution measurement B as illustrated in FIG. 8, and it is possible to prepare internal standard solution measurement C for discharging and aspirating the internal standard solution in addition to the diluent at the time of the section IS-1 as illustrated in FIG. 9. FIG. 9 is a diagram illustrating the internal standard solution measurement sequence.

With respect to the discharging amounts of the diluent and the internal standard solution in the section IS-1 of the internal standard solution measurement C, it is preferable that the discharging is performed such that the discharging amount is larger than that in the operations such as Steps S203, S204, and S208.

Accordingly, the temperature of the internal standard solution flow path and the nozzle can be controlled, the stability when the internal standard solution is discharged in Step S203 or S208 can be improved.

Further, though not illustrated, a time chart for discharging and aspirating only the internal standard solution at the time of the section IS-1 as illustrated in FIG. 9 can be prepared.

Further, according to the measurement interval during the intermittent measurement, the time chart executed at the time of restarting the measurement can be appropriately selected from the internal standard solution measurement B, the internal standard solution measurement C, or the like and properly used.

For example, the selection operation can be defined according to the measurement interval, in the forms of selecting the internal standard solution measurement B when the measurement interval is less than five minutes and the internal standard solution measurement C when the measurement interval is five minutes or more. Further, the temperature outside the device may be monitored and the internal standard solution measurement B and the internal standard solution measurement C may be properly used according to the outside air temperature.

For example, in the environments that are more severe for the temperature control such as the environments of extremely high temperature and low temperature, the countermeasure of using the internal standard solution measurement C and alleviating the temperature change by flowing the more reagent of which the temperature is controlled can be taken.

Subsequently, the determination flow of properly using the internal standard solution measurement A and the internal standard solution measurement B in the overall control unit 134 is described with reference to FIG. 10. The determination flowchart is illustrated in FIG. 10.

As illustrated in FIG. 10, the overall control unit 134 starts the determination (Step S301).

First, the overall control unit 134 determines whether the ISE measurement is performed in the immediately preceding cycle (Step S302).

If it is determined that the ISE measurement is performed, the process proceeds to Step S303, so that the overall control unit 134 uses the operation sequence of the internal standard solution measurement A illustrated in FIG. 8, and the operation time chart of each mechanism or the like is output to the control unit for analysis unit 134b (Step S303). The control unit for analysis unit 134b performs the operation in the analysis unit 111 based on the operation time chart input from the overall control unit 134.

In contrast, if it is determined that the last cycle in Step S302 is not the ISE measurement, the process proceeds to Step S304 so that the overall control unit 134 uses the operation sequence of the internal standard solution measurement B illustrated in FIG. 8 and outputs the operation time charts of each mechanism to the control unit for analysis unit 134b, respectively (Step S304). The control unit for analysis unit 134b performs the operation in the analysis unit 111 based on the operation time chart input from the overall control unit 134.

Thereafter, the overall control unit 134 completes the determination (Step S305).

The overall control unit 134 constantly executes the above flow during the analysis of the sample.

Subsequently, the effect of the embodiment is described by using FIG. 11.

FIG. 11 is a diagram illustrating a flow of an operation sequence process during the continuous measurement and the intermittent measurement of the electrolyte according to the present invention.

As illustrated in FIG. 11, during the continuous measurement, the internal standard solution measurement A and the sample measurement are alternately performed so that the process of measuring the sample proceeds. Meanwhile, during the intermittent measurement in a case where there is the vacant cycle, the internal standard solution measurement B is performed before restarting the sample measurement, and thereafter, the process shifts to the sample measurement.

Accordingly, the intermittent measurement can be performed at the same cycle as in the continuous measurement, the electrolyte measurement after generating the vacant cycle can be started more smoothly than that in the automatic analysis system of the related art. That is, since the cycle occupied by the conditioning is eliminated, the restart timing of the electrolyte measurement can be advanced as compared with the system of the related art to greatly contribute to maintain the processing capacity of the device at a high level.

The time of +α generated in the device of the related art of FIG. 7 can be greatly reduced, and the sequence required for measuring the sample can be processed in the shortest time.

Further, since the same effect as the conditioning can be obtained in the internal standard solution measurement sequence, the stability of the electrolyte analysis performances can be achieved.

Such a function is particularly useful for a device in which the electrolyte measuring part 114 and the colormatric determining unit 118 are mounted on one analysis unit 111, particularly for a system often used in the small automatic analysis system 100. In such a device, flexible analysis with a small turning radius such as special inspection or a night shift is required, and the present invention becomes a system that can particularly contribute to such inspection.

The operation can be added by using only the vacant interval (the section IS-1) of the internal standard solution measurement sequence, and thus a complicated sequence is not required to be prepared on the software configuration, and processing on the software configuration or the system management can be expected to be simplified.

Furthermore, since it is possible to appropriately add operations that can be performed within the range of the section IS-1, such as discharging and aspiration of only the diluent and discharging and aspiration of the combination of the diluent and the internal standard solution, an appropriate conditioning process can be selected depending on the change of the measurement circumstances such as the measurement environment or the measurement interval or the device installation environment.

In the above, the automated analyzer that can contribute to the stability of electrolyte data and the speed of inspection can be provided.

The automatic analysis system 100 or the analysis unit 111 according to the present invention as above is suitably used alone or as an element of a biochemical automated analyzer in order to perform clinical inspection automatically, promptly, and continuously.

The first time chart that defines the operation of the electrolyte measuring part 114 in a case where the potential is continuously measured and the second time chart of the operation of the electrolyte measuring part 114 in a case where the potential is not continuously measured are provided. Particularly, the first time chart is provided with a vacant interval when the electrolyte measuring part 114 does not operate at the beginning of the time chart, and the second time chart is defined such that an operation of discharging or aspirating at least any one of the internal standard solution and the diluent for diluting the sample is performed at a timing corresponding to the vacant interval of the first time chart, so that the operation can be promptly substituted between a case where the electrolyte is continuously measured and a case where the electrolyte is discontinuously measured, and the system can be operated stably.

The second time chart is defined such that an operation of discharging or aspirating only the diluent is performed, so that the improvement of the accuracy of the electrolyte measurement can be definitely achieved while the consumption amount of the reagent is suppressed from being increased more than necessary.

Further, the second time chart is defined such that an operation of discharging or aspirating both the internal standard solution and the diluent is performed so that the electrolyte can be stably measured compared with a case where an operation of discharging and aspirating only the diluent is performed.

Among the second time chart, since an amount of the internal standard solution and the diluent to be aspirated or discharged at the timing of the second time chart corresponding to the vacant interval of the first time chart is more than that in any operation to be performed during a potential measurement of the internal standard solution, the temperature control becomes effective, and the diluent or the internal standard solution is definitely discharged, so that the temperature control of the diluent tank 1 and the like can be definitely achieved, and the electrolyte can be measured more accurately.

Further, the analysis unit 111 includes one or more analyzing parts having a measurement principle different from that of the electrolyte measuring part 114. Particularly, the electrolyte measuring part 114 and the analyzing part share the sample dispensing nozzle 2, an operation cycle time of the electrolyte measuring part 114 and an operation cycle time of the sample dispensing nozzle 2 are different from each other, and the analyzing part analyzes at least any one of a biochemical analysis item and an immunoassay item.

Here, in the automated analyzer in which the analyzing part by the absorptiometry and the electrolyte measurement are combined to share the sampling mechanism, it is general that the number of times of processing measurement items other than the electrolyte is generally larger, and the frequency of continuously measuring the electrolyte decreases. Therefore, the electrolyte measurement is intermittent measurement in a lot of cases. Further, the electrolyte measurement has high sensitivity and thus is generally performed before the colorimetric analysis by the absorptiometry in consideration of the concentration of the sample and the thinning of the sample by the introduction of the washing water with the sampling nozzle.

Therefore, in order to maintain the analysis performances of the electrolyte measurement, in a case where the conditioning is inserted before the next measurement at the time of intermittent measurement, conditioning is started before each sampling, and then each operation cycle is individually performed in the form of the internal standard solution measurement. Therefore, the start of electrolyte analysis is delayed by that amount.

In particular, in the case of a system in which the colormatric determining unit and the electrolyte measuring part share the sample dispensing nozzle, the electrolyte measurement is very frequently intermittent, and a situation that requires the conditioning frequently occurs. However, a risk of delay in starting the electrolyte measurement is generated each time, and it is very likely to influence on the process of the colorimetric analysis performed after the electrolyte measurement.

However, as described above, it is possible to prevent such a problem from occurring by changing the operation of measuring the internal standard solution before the potential measurement, between a case where the potential of the sample is continuously measured by the electrolyte measuring part 114 as described above and a case where there is the interval between the measurements without continuously measuring the potential.

<Others>

The present invention is not limited to the above embodiments, and various modifications and applications can be provided. The above embodiments have been described in detail for easier understanding of the present invention and are not limited to necessarily include all the described configurations.

REFERENCE SIGNS LIST

1: diluent tank
2: sample dispensing nozzle
3: diluent dispensing nozzle
4: internal standard solution dispensing nozzle
5: sample liquid aspiration nozzle
6, 11: pipe
7: sodium ion selective electrode
8: potassium ion selective electrode
9: chlorine ion selective electrode
10: reference electrode
12: sipper pump
13: potential measuring part
14: diluent container
15: internal standard solution container
16: temperature control unit
17: reference electrode liquid container
18: pump for diluent (DIL pump)
19: pump for internal standard solution (IS pump)
100: automatic analysis system
101: transport unit (transport device)
102: rack supply tray
103: rack buffer
104: sample rack
106: transport line
107: rack housing tray
111: analyzing unit (automated analyzer)
112: sample dispensing line
114: electrolyte measuring part
115: reaction disk
116: reagent dispensing nozzle
117: reagent disk
118: colormetric determining part (analyzing part)
130: operation unit
131: display part
132: input part
133: recording part
134: overall control unit
134*a*: control unit for transport unit
134*b*: control unit for analyzing unit
134*c*: calculation recording part

The invention claimed is:

1. An automated analyzer that automatically analyzes a sample, the analyzer comprising:
a sample dispensing nozzle that dispenses the sample; and
an electrolyte measuring part configured to measure an internal standard solution once or more at least before measuring a potential of the sample, wherein
the electrolyte measuring part is further configured so that the operation of measuring the internal standard solution before measuring the potential of the sample is different between a case where the electrolyte measuring part continuously measures the potential of the sample without a vacant cycle and a case where the potential of the sample is not continuously measured and there is the vacant cycle, and
the operation of measuring the internal standard solution is determined based on whether an immediately preceding measurement cycle is vacant.

2. The automated analyzer according to claim 1, further comprising:
a first time chart that defines an operation of the electrolyte measuring part when the potential is continuously measured without the vacant cycle; and
a second time chart that defines an operation of the electrolyte measuring part when there is the vacant cycle.

3. The automated analyzer according to claim 2, wherein
a vacant interval during which the electrolyte measuring part does not operate is provided at the beginning of the first time chart, and
the second time chart is defined such that an operation of discharging or aspirating at least any one of the internal standard solution and a diluent for diluting the sample is performed at a timing corresponding to the vacant interval of the first time chart.

4. The automated analyzer according to claim 3, wherein
the second time chart is defined such that an operation of discharging or aspirating only the diluent is performed.

5. The automated analyzer according to claim 3, wherein
the second time chart is defined such that an operation of discharging or aspirating both the internal standard solution and the diluent is performed.

6. The automated analyzer according to claim 3, wherein
the analyzer is configured to dispense an amount of the internal standard solution and the diluent to be aspirated or discharged at the timing of the second time chart corresponding to the vacant interval of the first time chart more than an amount in any operation to be performed during a potential measurement of the internal standard solution.

7. The automated analyzer according to claim 1, further comprising:
one or more analyzing parts having a measurement principle different from that of the electrolyte measuring part.

8. The automated analyzer according to claim 7, wherein
the electrolyte measuring part and the analyzing part share the sample dispensing nozzle.

9. The automated analyzer according to claim 7, wherein
the automated analyzer further comprises a controller configured to operate the electrolyte measuring part according to an operation cycle time that is different from an operation cycle time of operating the sample dispensing nozzle.

10. The automated analyzer according to claim 7, wherein
the analyzing part analyzes at least any one of a biochemical analysis item and an immunoassay item.

11. An automatic analysis system comprising:
at least one or more automated analyzers according to claim 1, and
a transport device that supplies the sample to the automated analyzer.

12. The automated analyzer according to claim 1, wherein
an operation of a first half of the operation of measuring the internal standard solution is caused to be changed between a case where the operation is performed without the vacant cycle and a case where there is the vacant cycle.

13. An automated analyzer that automatically analyzes a sample, the analyzer comprising:
a sample dispensing nozzle that dispenses the sample; and
an electrolyte measuring part that measures an internal standard solution once or more at least before measuring a potential of the sample and determines an operation of measuring internal standard solution based on whether an immediately preceding measurement cycle is vacant, wherein
the automated analyzer is configured so that in a case where there is an interval between measurements without the electrolyte measuring part continuously measuring the potential of the sample, an operation of discharging or aspirating at least any one of the internal standard solution and a diluent for diluting the sample is performed before the operation of measuring the internal standard solution, and in a case where the potential is continuously measured, the operation of discharging or aspirating at least any one of the internal standard solution and a diluent for diluting the sample is not performed unlike the case where there is the interval, and the measurement of the internal standard solution is started after a period of time required for the discharging or aspirating operation.

14. An automatic analysis system comprising:
at least one or more automated analyzers according to claim 13, and
a transport device that supplies the sample to the automated analyzer.

15. An automatic analysis method of analyzing a sample using an automated analyzer,
the automated analyzer including a sample dispensing nozzle that dispenses the sample and an electrolyte measuring part that measures an internal standard solution once or more at least before measuring a potential of the sample, the method comprising:
causing the operation of measuring the internal standard solution before measuring the potential to be changed between a case where the electrolyte measuring part continuously measures the potential of the sample without a vacant cycle and a case where the potential is not continuously measured and there is the vacant cycle, and
the operation of measuring the internal standard solution is determined based on whether an immediately preceding measurement cycle is vacant.

16. The automatic analysis method of analyzing a sample according to claim 15, wherein
an operation of a first half of the operation of measuring the internal standard solution is caused to be changed between a case where the operation is performed without the vacant cycle and a case where there is the vacant cycle.

* * * * *